United States Patent
Kamimura (10) Patent No.: US 8,837,933 B2
(45) Date of Patent: *Sep. 16, 2014

(54) SHUTTER CONTROL DEVICE

(75) Inventor: Masayuki Kamimura, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 13/529,100

(22) Filed: Jun. 21, 2012

(65) Prior Publication Data
US 2013/0011126 A1 Jan. 10, 2013

(30) Foreign Application Priority Data
Jul. 8, 2011 (JP) ................................. 2011-152153

(51) Int. Cl.
G03B 7/00 (2014.01)
G03B 17/00 (2006.01)
H04N 5/235 (2006.01)
(52) U.S. Cl.
USPC ............................ 396/213; 396/529; 348/362
(58) Field of Classification Search
USPC ................. 396/529–533, 452, 213, 215, 236; 348/360, 362
See application file for complete search history.

(56) References Cited

U.S. PATENT DOCUMENTS

| 5,060,005 | A * | 10/1991 | Itoh et al. ....................... 396/303 |
| 7,593,055 | B2 * | 9/2009 | Nakamura et al. ............. 348/360 |
| 7,645,080 | B2 * | 1/2010 | Toji ................................ 396/531 |
| 2007/0147815 | A1 * | 6/2007 | Tanaka .............................. 396/56 |
| 2013/0011130 | A1 * | 1/2013 | Kamimura ..................... 396/452 |

FOREIGN PATENT DOCUMENTS

JP 2008-026888 A 2/2008

OTHER PUBLICATIONS

U.S. Appl. No. 13/525,468 to Masayuki Kamimura, filed Jun. 18, 2012.

* cited by examiner

Primary Examiner — Christopher Mahoney
(74) Attorney, Agent, or Firm — Greenblum & Bernstein, P.L.C.

(57) ABSTRACT

A shutter control device that uses an imaging device provided in a camera body to operate a shutter housed in a lens barrel to perform photography. The shutter control device comprises a communication port and a shutter control unit. The communication port is provided for transmitting and receiving signals between the camera body and the lens barrel. The shutter control unit is provided in the camera body, and outputs a shutter control signal to operate the shutter. The shutter control signal is transmitted to the lens barrel through the communication port.

8 Claims, 9 Drawing Sheets

SHUTTER CONTROL DEVICE

BACKGROUND OF THE INVENTION

1. Field of the Invention

The present invention relates to a camera with interchangeable lenses, in which a shutter is provided in a lens barrel, and more particularly to a device for controlling an operation of the shutter.

2. Description of the Related Art

Conventionally, there is known a compact camera, in which a lens barrel can be changed, as disclosed in Japanese Unexamined Patent Publication No. 2008-026888. In such a camera, it is necessary to transmit and receive data or commands between the camera body and the lens barrel, so that a microcomputer provided in the camera body can perform proper processes in accordance with the lens attached to the camera body.

However, there has not been a camera in which the shutter is provided only in the lens barrel. Thus, when such a camera is designed and developed, various problems could occur depending on how the shutter would be controlled from the camera body. For example, electrical contacts may be increased for data communication between the camera body and the lens barrel. However, if the number of electrical contacts is increased because of the shutter control, the construction of the camera system would become complex, and the control would become complicated.

SUMMARY OF THE INVENTION

Therefore, an object of the present invention is to provide a shutter control device that can operate a shutter, which is housed in the lens barrel, with a simple control and without any modification to the construction of the electrical contact for data communication.

According to the present invention there is provided a shutter control device that uses an imaging device provided in a camera body to operate a shutter housed in a lens barrel to perform photography. The shutter control device comprises a communication port and a shutter control unit. The communication port is provided for transmitting and receiving signals between the camera body and the lens barrel. The shutter control unit is provided in the camera body, and outputs a shutter control signal to operate the shutter. The shutter control signal is transmitted to the lens barrel through the communication port.

Further, according to the present invention there is provided a lens barrel detachably attached to a camera body. The lens barrel comprises a communication port and a shutter. The communication port transmits and receives signals between the camera body and the lens barrel. The shutter is operated by a shutter control signal output by the camera body. The shutter control signal is transmitted to the lens barrel through the communication port.

Furthermore, according to the present invention there is provided a camera body to which a lens barrel, in which a shutter is provided, is detachably attached. The camera body comprises a communication port and a shutter control unit. The communication port transmits and receives signals between the camera body and the lens barrel. The shutter control unit outputs a shutter control signal to operate the shutter. The shutter control signal is transmitted to the lens barrel through the communication port.

Further, according to the present invention there is provided a camera system, in which a lens barrel is detachably attached to a camera body. The camera system comprises a shutter, a first communication port, a second communication port, and a shutter control unit. The shutter is provided in the lens barrel. The first communication port is provided in the lens barrel to transmit and receive signals between the camera body and the lens barrel. The second communication port is provided in the camera body to transmit and receive signals between the camera body and the lens barrel. The shutter control unit is provided in the camera body, and outputs a shutter control signal to operate the shutter. The shutter control signal is output from the second communication port and input to the lens barrel through the first communication port.

BRIEF DESCRIPTION OF THE DRAWINGS

The object and advantages of the present invention will be better understood from the following description, with reference to the accompanying drawings in which.

DESCRIPTION OF THE PREFERRED EMBODIMENTS

A first embodiment of the present invention will be described below with reference to the drawings.

Figure 1:
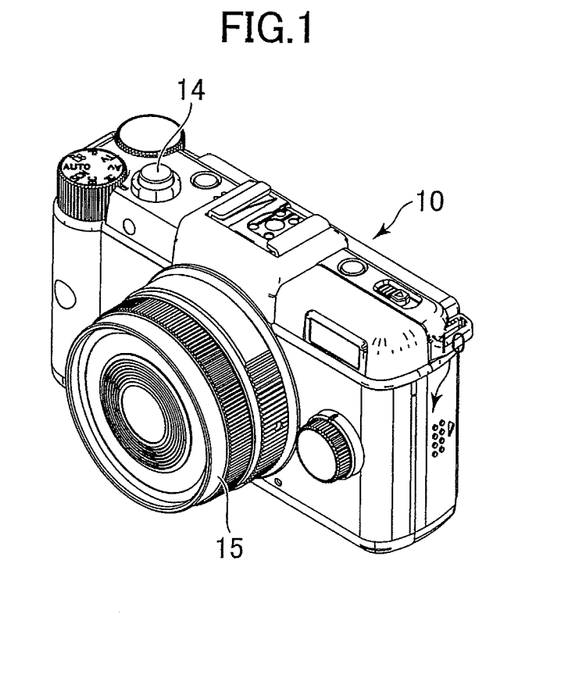
FIG. 1 is a perspective view of a camera with interchangeable lenses to which a first embodiment of the present invention is applied.
Figure 2:
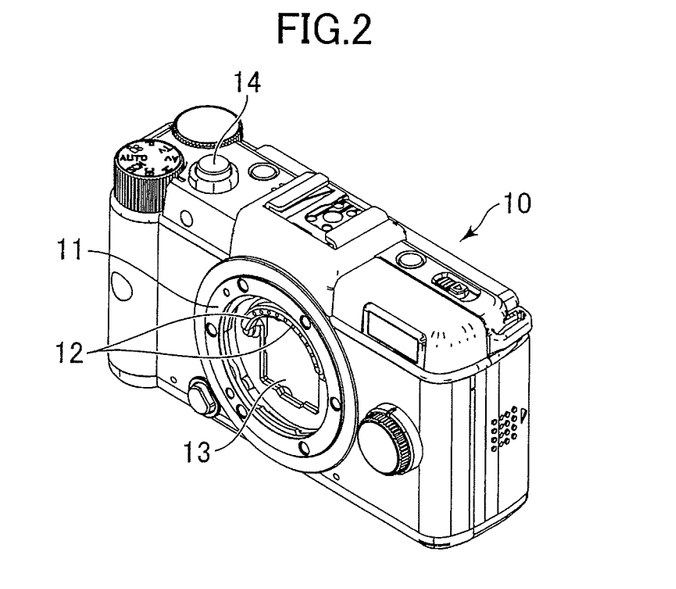
FIG. 2 is a perspective view of a camera body in which a lens barrel is removed from the camera shown in FIG. 1.

FIG. 1 shows an external appearance of a camera with an interchangeable lens, and FIG. 2 shows the camera without a lens barrel 15, which has been removed from its camera body 10. In this camera system the lens barrel 15 is detachably attached to the camera body 10. A shutter is provided in the lens barrel 15, and a shutter operation is performed by a camera processor provided in the camera body 10, as described below. In this embodiment the shutter is usually open, and is closed by a shutter release.

A plurality of electrical contacts 12 are disposed in the form of an arch in the inside of a lens mount 11 of the camera body 10. An imaging device unit 13, in which an imaging device (not shown) is housed, is provided under the electrical contacts 12. When electrical power of the camera body 10 is turned on, moving images are obtained through the imaging device and can be displayed on a monitor (not shown) as a live view. A shutter button 14 is provided on an upper surface of the camera body 10. When the shutter button 14 is partly depressed an AF operation is carried out, and when the shutter button 14 is fully depressed the shutter is operated by a camera processor provided in the camera body 10, so that a still image is taken. Thus, photography is performed using the imaging device.

Figure 3:
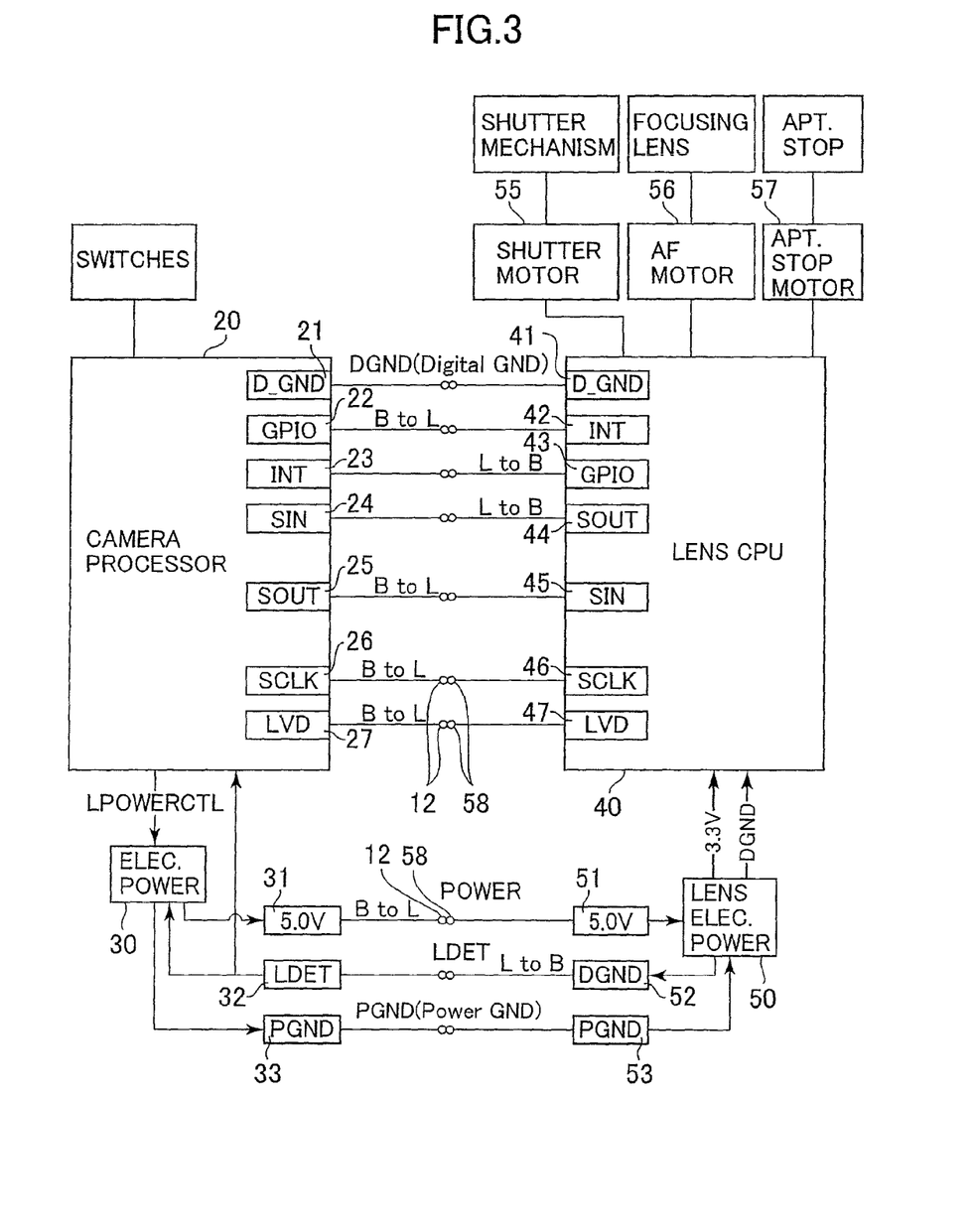
FIG. 3 is a block diagram showing an electrical structure of the camera body and the lens barrel.

With reference to FIG. 3, the electrical structure of the camera with interchangeable lenses is described below.

A camera processor 20 provided in the camera body 10 has communication ports such as a grounding port 21 for digital signals, an input/output port 22, an interruption port 23, a serial data input port 24, a serial data output port 25, a clock signal port 26, a vertical synchronizing signal port 27, and so on. The camera processor 20 is connected to the electrical power source 30, which is connected to an electrical power terminal 31, a sensing terminal 32, and a grounding terminal 33 for electrical power.

A lens CPU 40 provided in the lens barrel 15 has communication ports such as a grounding port 41 for digital signals, an interruption port 42, an input/output port 43, a serial data output port 44, a serial data input port 45, a clock signal port 46, a vertical synchronizing signal port 47, and so on. The lens CPU 40 is connected to a lens electric power source 50, which is connected to an electrical power terminal 51, a grounding terminal 52 for digital signals, and a grounding terminal 53 for electrical power. Further, the lens CPU 40 is connected to a shutter motor 55, an AF motor 56, and an aperture stop motor 57.

When the lens barrel 15 is attached to the camera body 10, electrical contacts 58 of the lens barrel 15 come in contact with the electrical contacts 12 of the camera body 10. Thus, the sensing terminal 32 is electrically connected to the grounding terminal 52 for digital signals, and by so being grounded the camera processor 20 recognizes the mounting of the lens barrel 15 to the camera body 10. As a result, the camera processor 20 turns on the lens electric power 50 through the electrical power terminals 31 and 51, so that communication becomes possible between the camera body 10 and the lens barrel 15. That is, signals are transmitted and received through the communication ports between the camera body 10 and the lens barrel 15. For example, in accordance with a control of the camera processor 20, the AF motor 56 is driven to carry out an AF operation, the aperture stop motor 57 is driven to adjust an opening degree of the aperture stop, and the shutter motor 55 is driven to perform a photographing operation.

Figure 4:
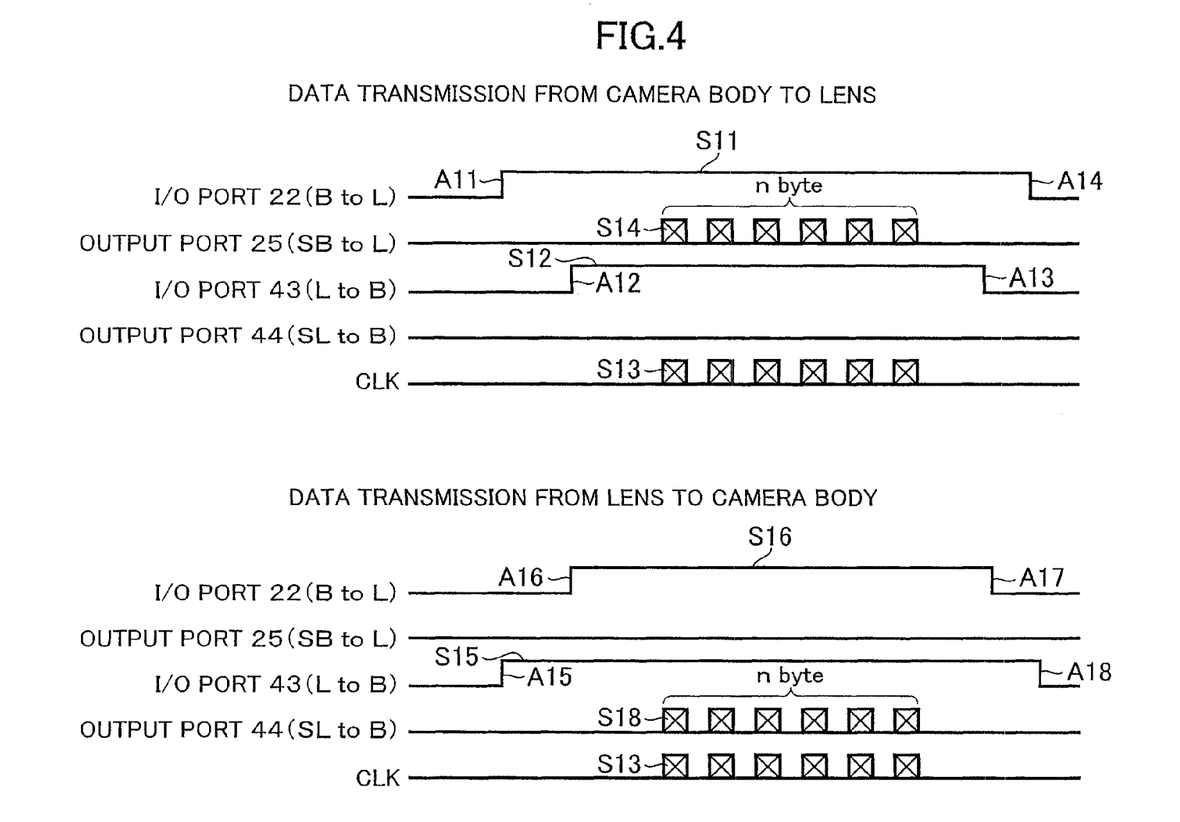
FIG. 4 is a timing chart of a communication sequence between the camera body and the lens barrel.

With reference to FIGS. 3 and 4, an example of a communication sequence between the camera body and the lens barrel is described below. First, the transmission of data from the camera processor 20 to the lens CPU 40 is described.

A communication request signal S11 is output from the camera processor 20 when the output level of the input/output port 22 is raised to "HIGH" (see A11), and input to the interruption port 42 of the lens CPU 40. By a change in the communication request signal S11 to "HIGH", the lens CPU 40 carries out a preparation process for communication, and then generates a "HIGH" communication admission signal S12. That is, the output level of the input/output port 43 is changed from "LOW" to "HIGH" (see A12) and the communication admission signal S12, which is "HIGH", is input to the interruption port 23 of the camera processor 20. Due to this, communication becomes possible between the camera processor 20 and the lens CPU 40. Thus, the communication request signal S11 and the communication admission signal S12 are handshake signals and the interruption ports 23 and 42 are handshake ports for receiving the handshake signals.

When the handshake is completed, the camera processor 20 and the lens CPU 40 can communicate with each other, at which time the camera processor 20 outputs a camera signal (serial data) S14 of n bytes, such as a command, through the output port 25 in synchronization with a serial clock signal S13 output from the clock signal port 26. The serial clock signal S13 is input to the clock signal port 46 of the lens CPU 40, and the camera signal S14 is input to the input port 45 of the lens CPU 40. When the input operation of the camera signal S14 is completed, the communication admission signal S12 is changed to "LOW". Namely, the output level of the input/output port 43 of the lens CPU 40 is changed from "HIGH" to "LOW" (see A13) and the communication admission signal S12, which is "LOW", is input to the interruption port 23 of the camera processor 20. By a change in the communication admission signal S12 to "LOW", the camera processor 20 changes the communication request signal S11 to "LOW". Namely, the output level of the input/output port 22 of the camera processor 20 is changed from "HIGH" to "LOW" (see A14), so that the communication admission signal S11, which is "LOW", is input to the interruption port 42 of the lens CPU 40, to complete the data transmission from the camera processor 20 to the lens CPU 40.

Data transmission from the lens CPU 40 to the camera processor 20 is similar to the above-described operation. First, the output level of the input/output port 43 of the lens CPU 40 is changed from "LOW" to "HIGH" (see A15) so that the communication request signal S15 becomes "HIGH", and it is then input to the interruption port 23 of the camera processor 20. The camera processor 20 carries out a preparation process for communication, and then an output level of the input/output port 22 is changed from "LOW" to "HIGH" (see A16) and the communication admission signal S16 becomes "HIGH". The communication admission signal S16 is input to the interruption port 42 of the lens CPU 40, which enables a communication between the lens CPU 40 and the camera processor 20.

Then, the lens CPU 40 outputs a lens signal (serial data) S18 of n bytes through the output port 44 in synchronization with a serial clock signal S13 output from the clock signal port 26 of the camera processor 20, and is input to the input port 24 of the camera processor 20. When the input operation of the lens signal S18 is completed, the communication admission signal S16 is changed to "LOW". Namely, the output level of the input/output port 22 of the camera processor 20 is changed from "HIGH" to "LOW" (see A17), and the communication admission signal S16, which is "LOW", is input to the interruption port 42 of the lens CPU 40. When the communication admission signal S16 becomes "LOW", the output level of the input/output port 43 of the lens CPU 40 is changed from "HIGH" to "LOW" (see A18). That is, the communication request signal S15 becomes "LOW" and the data transmission from the lens CPU 40 to the camera processor 20 is completed.

Note that, regarding the communication ports shown in FIG. 3, the grounding ports 21 and 41 are provided for grounding digital signals, and the vertical synchronizing signal ports 27 and 47 are provided for transmitting vertical synchronizing signals from the camera processor 20 to lens CPU 40 at every frame, i.e., 1/60 second.

As described above, data transmission and reception are carried out between the camera processor 20 and the lens CPU 40 during one frame. For example, when a command (camera signal S14) to request the current lens condition is transmitted from the camera processor 20 to the lens CPU 40, data (lens signal S18) such as lens performance information is transmitted to the camera processor 20. Such data transmission and reception are periodically performed when the electrical power 30 of the camera body 10 is turned on and the shutter button 14 is not depressed, while at the same time a moving image obtained through the imaging device is displayed as a live view on a monitor of the camera body 10.

When the shutter button 14 is depressed, the communication sequence is carried out basically in the same manner as described above in which the shutter button 14 is not depressed. That is, when the shutter button 14 is partly depressed, an AF operation is performed. Thus, a command (camera signal S14) of the AF operation is output from the camera processor 20, so that the lens starts to move toward the focusing position, and information (lens signal S18) such as the lens position is transmitted from the lens CPU 40 to the camera processor 20. In the camera processor 20, the focusing condition is detected using a contrast calculation based on an image obtained by the imaging device. Thus, when the focusing condition has not been attained, a command, by which the lens is adjusted, is output; and when the focusing condition is attained, a command, by which the lens is stopped, is output.

Figure 5:
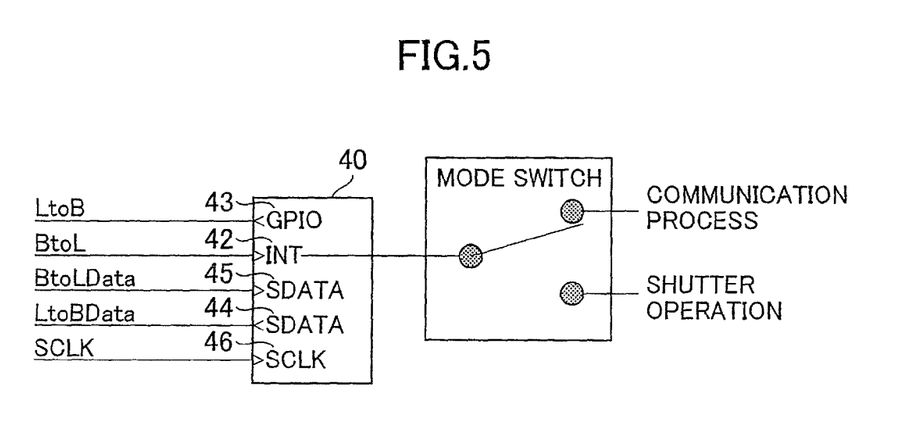
FIG. 5 is a view generally showing a change of operation mode of an interruption port of a camera CPU.

When the shutter is fully depressed, a photographing operation for a still image is carried out using the communication ports. The usage of the communication ports is described below, with reference to FIG. 5. A mode switch shown in FIG. 5 is a software switch, and is changed between a communication process mode and a shutter operation mode. The mode switch is usually set to the communication process mode, and is changed to the shutter operation mode when a shutter operation command (camera signal S14) is output from the camera processor 20.

In the communication process mode, the communication request signal S11 or the communication admission signal S16 output from the camera processor 20 is input to the interruption port 42. Conversely, in the shutter operation mode, a shutter control signal output from the camera processor 20 is input to the interruption port 42. Thus, the communication request signal S11, the communication admission signal S16, and the shutter control signal are transmitted from the camera body 20 to the lens CPU 40 through the same communication line, and are electrically identical, even though different processes are carried out in the lens CPU 40 depending upon the mode.

The reason why the interruption port 42 is used to input the shutter control signal to the lens CPU 40 is that the interruption port 42 is configured to perform the requested process in the lens CPU 40 immediately in response to the control signal, even while another process is being carried out in the lens CPU 40. That is, the interruption port 42 is suitable for inputting a time-critical control signal, such as the shutter control signal. Therefore, in the embodiment, the interruption port 42 is used not only as a handshake port, but also for inputting the shutter control signal to the lens CPU 40.

Figure 6:
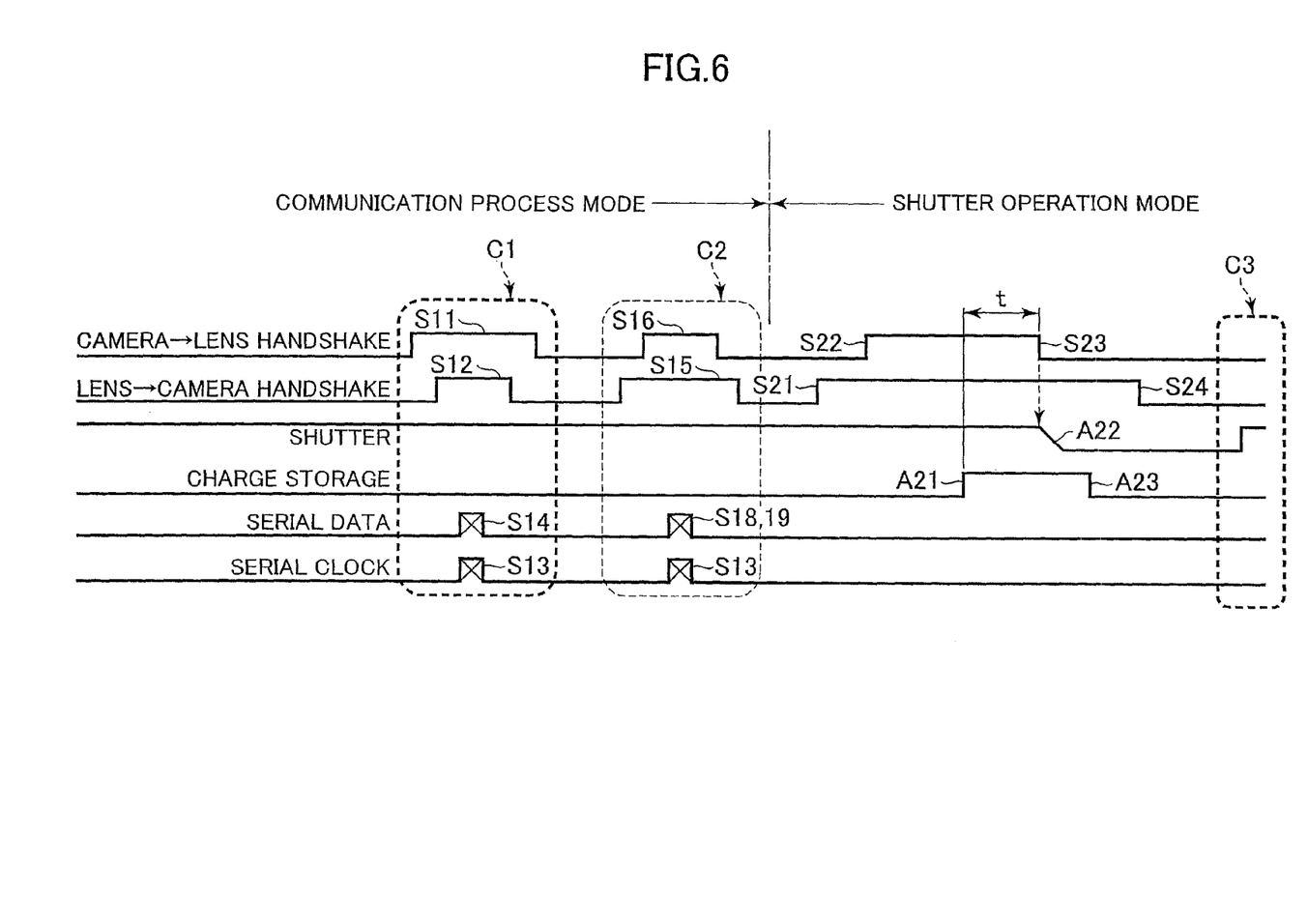
FIG. 6 is a timing chart for a shutter operation in accordance with the communication sequence.
Figure 7:
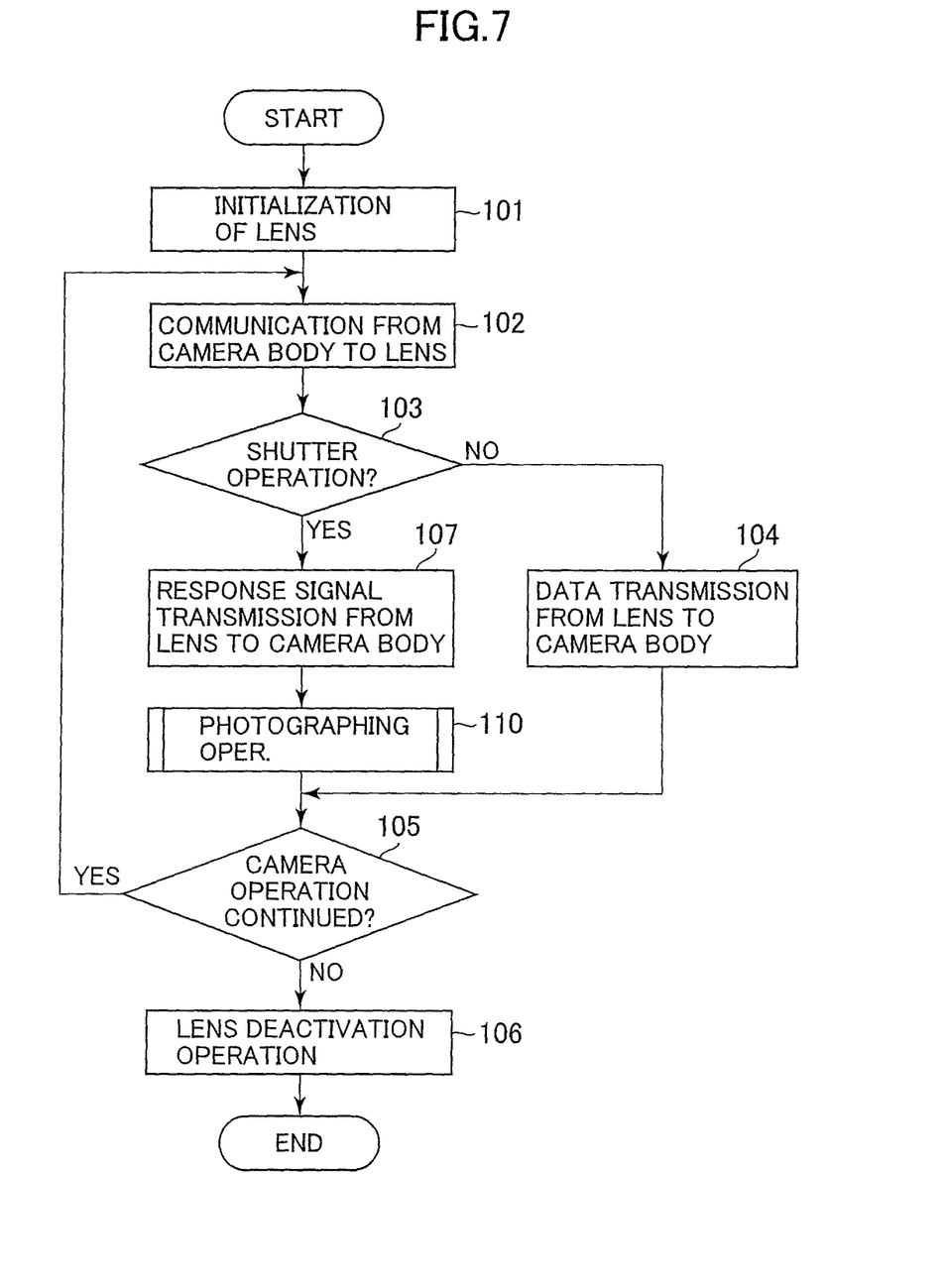
FIG. 7 is a flowchart showing the shutter operation in accordance with the communication sequence.
Figure 8:
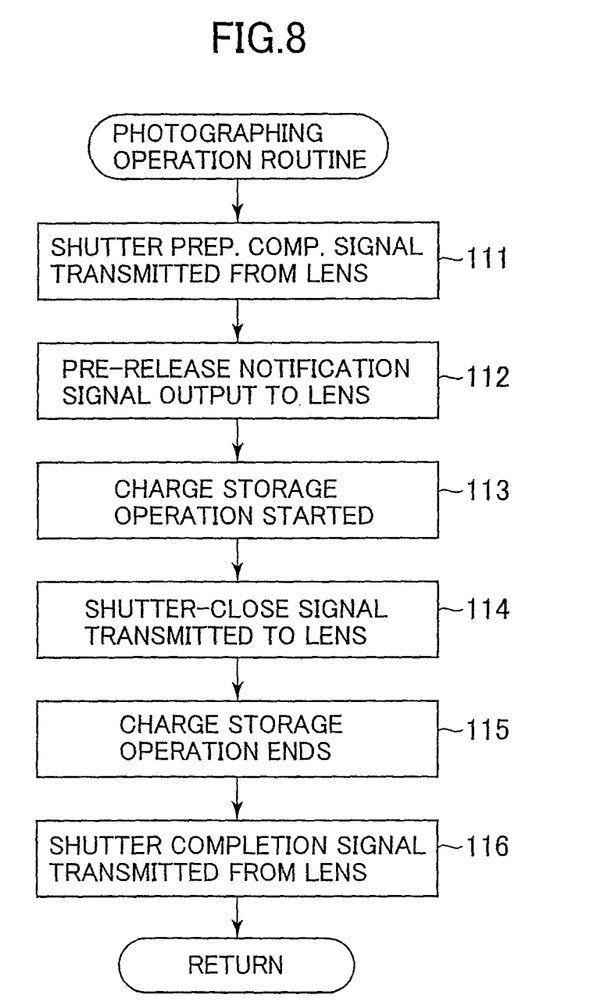
FIG. 8 is a flowchart for a photographing operation routine.

With reference to FIGS. 6-8, a control for a photographing operation is described below. Note that, in FIG. 6, one portion enclosed by a broken line C1 corresponds to the communication sequence of "DATA TRANSMISSION FROM CAMERA BODY TO LENS" in FIG. 4, and another portion enclosed by a broken line C2 corresponds to the communication sequence of "DATA TRANSMISSION FROM LENS TO CAMERA BODY" in FIG. 4.

In Step 101, the initialization of the lens is performed for a communication, so that various information is transmitted from the lens barrel to the camera processor 20. In Step 102, a communication from the camera processor 20 to the lens CPU 40 is carried out. That is, the camera signal S14 is output to the lens CPU 40 in synchronization with the serial clock signal S13 while the communication request signal S11 and the communication admission signal S12 are "HIGH".

In Step 103, it is determined whether or not a shutter operation command is contained in the camera signal S14. When the shutter operation command is not included, a process corresponding to the camera signal S14 is carried out in Step 104. For example, when the shutter button is not depressed, data such as lens information (lens signal S18) is transmitted from the lens CPU 40 to the camera processor 20 because a command requesting the current lens condition is contained in the camera signal S14. When the shutter button 14 is partly depressed, information such as lens position and so on (lens signal S18) is transmitted from the lens CPU 40 to the camera processor 20 since a command for an AF operation is contained in the camera signal S14.

In Step 105, it is determined whether or not the camera operation is to be continued. When the electrical power of the camera body is turned on, the process goes back to Step 102, and the operations described above are repeated. Namely, the communication sequences enclosed by the broken lines C1 and C2 in FIG. 6 are carried out repeatedly. During the communication, if the electrical power of the camera body is turned off by the user, the process goes from Step 105 to Step 106, so that a predetermined lens deactivation operation is performed, and the communication sequence ends.

When the shutter button is fully depressed, the shutter operation command is contained in the camera signal S14. The shutter operation command informs the lens CPU 40 to prepare for a shutter release, i.e., to use the communication line connected to the interruption port 42 for transmitting the shutter control signal. In this case, the process goes from Step 103 to Step 107, so that a response signal S19, which is one byte indicating whether or not a shutter release is possible, is transmitted from the lens CPU 40 to the camera processor 20. When the shutter release is possible, the process proceeds to Step 110 and a photographing operation is carried out. Conversely, when the shutter release is not possible, Step 110 is skipped and Step 105 is carried out.

In the photographing operation routine Step 111, a shutter preparation completion signal S21 is first transmitted from the lens CPU 40 to the camera processor 20. The shutter preparation completion signal S21 corresponds to the output level of the input/output port 43 of the lens CPU 40 that has been raised from "LOW" to "HIGH", and is output to the interruption port 23 of the camera processor 20. It is recognized in the camera processor 20 that preparations for a shutter release have been completed, in accordance with the shutter preparation completion signal S21. Thus, the output level of the input/output port 22 is raised from "LOW" to "HIGH", and this information is output to the interruption port 42 as a pre-release notification signal S22 in Step 112. In the lens CPU 40, it is recognized that a shutter release is approaching, due to the input of the pre-release notification signal S22.

After the output of the pre-release notification signal S22, the camera processor 20 carries out the Global Reset of the imaging device (CMOS) to sweep out any unnecessary electric charge in Step 113, so that a charge storage operation is started in the imaging device (see A21). When a shutter time "t" has passed since the start of the charge storage operation, the output level of the input/output port 22 of the camera processor 20 falls from "HIGH" to "LOW", and this information is output to the interruption port 42 of the lens CPU 40 as a shutter-close signal (or shutter control signal) S23 in Step 114. Thus, the shutter control signal is transmitted to the lens CPU 40 through the input/output port 22 and the interruption port 42. Then, in the lens barrel, a shutter release is carried out, in which the shutter is closed (see A22). Then, in Step 115 the charge storage operation of the imaging device ends (see A23) and the process proceeds to Step 116, in which an output level of the input/output port 43 of the lens CPU 40 falls from "HIGH" to "LOW" and a shutter completion signal S24 indicating that the shutter operation has been completed is output to the interruption port 23 of the camera processor 20.

When the photographing operation routine ends, as described above, it is determined in Step 105 whether or not the camera operation is to be continued, and when the electric power of the camera body is turned on, the process returns to Step 102. Namely, the communication sequence is changed from the shutter operation mode to the communication process mode (see FIG. 5), and the only signals that are communicated through the interruption ports 23 and 42 between the camera processor 20 and the lens CPU 40 are the communication request signals S11, S15 and the communication admission signals S12, S16, so that the usual communication sequence is performed (see C3). In Step 105, when the electric power of the camera body is turned off, the communication sequence ends.

As described above, for transmitting the shutter control signal for a shutter release to the lens CPU 40, a specific communication line is not provided and instead the communication lines used for the usual lens communication are utilized. Therefore, it is not necessary to provide additional electrical contacts for a shutter operation, and thus, the electrical structure can be simplified and the manufacturing cost can be reduced. Further, since the shutter control signal is input to the interruption port 42 of the lens CPU 40, the shutter control signal always has priority before any other process performed in the lens CPU 40, and thus a high shutter speed operation, which cannot be performed in a usual communication, can be carried out.

Figure 9:
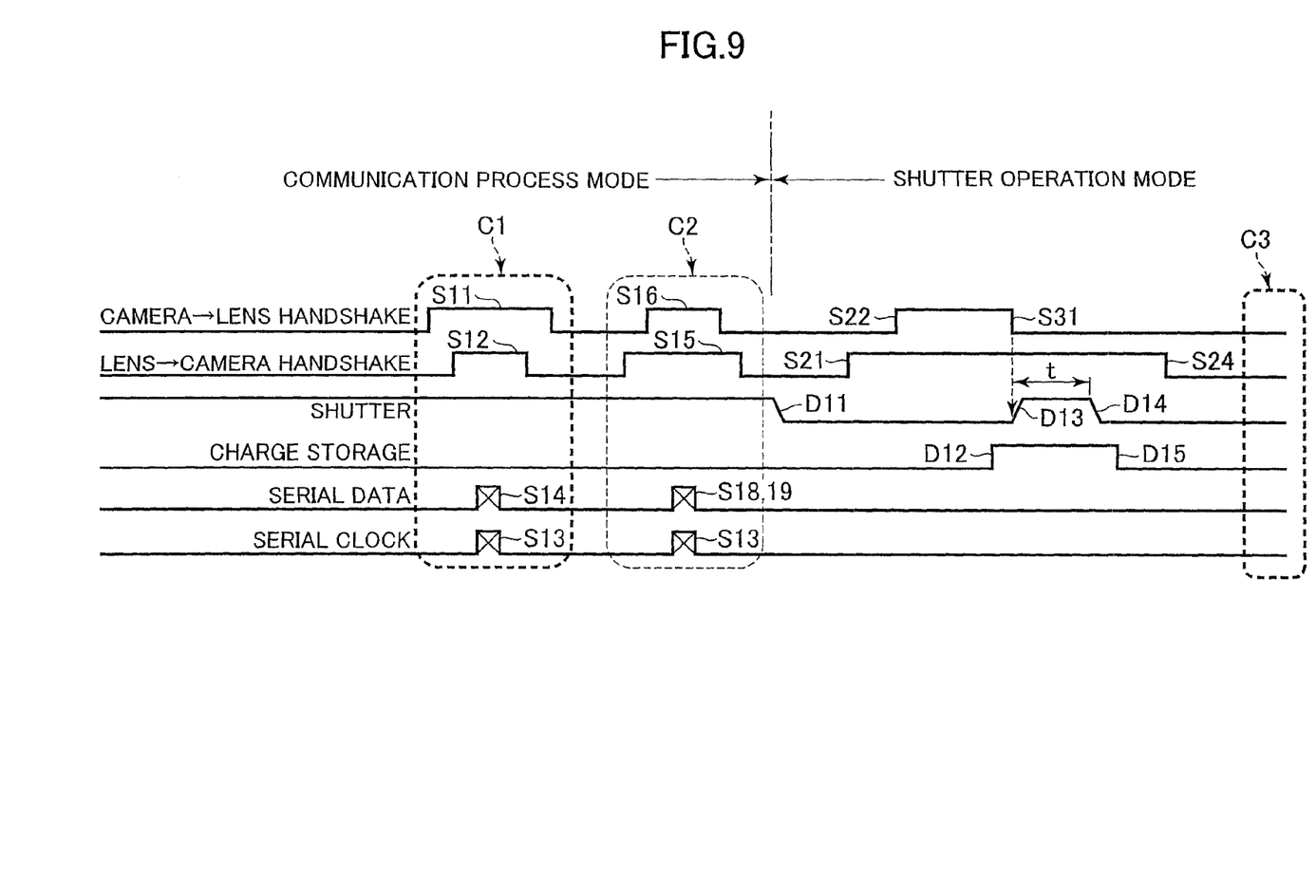
FIG. 9 is a timing chart for a shutter operation according to a communication sequence in a second embodiment.

FIG. 9 shows a shutter operation according to a communication sequence in a second embodiment. The common references have been applied to the corresponding signals from the first embodiment shown in FIG. 6. A camera of the second embodiment is configured to open and close the shutter to carry out a photographing operation, which is different from the first embodiment. Therefore, shutter speed information (i.e., Tv value) is output from the camera processor 20 in addition to the shutter control signal, and transmitted to the lens CPU 40 through the communication ports.

After a command (or a camera signal S14) for a shutter operation and a response signal S19 have been communicated between the camera processor 20 and the lens CPU 40, inside the lens barrel the shutter is changed from an open state to a closed state and fixed to the closed state (see D11). Then, in the camera processor 20, a shutter preparation completion signal S21 is input, so that the camera processor 20 recognizes that the shutter is closed, and outputs a pre-release notification signal S22.

After the output of the pre-release notification signal S22, the Global Reset is carried out in the imaging device to sweep out any unnecessary electric charge so that a charge storage operation can then be started in the imaging device (see D12). Then, the output level of the input/output port 22 of the camera processor 20 falls from "HIGH" to "LOW", and this information is output to the interruption port 42 of the lens CPU 40 as a shutter-open signal (or shutter control signal) S31. Thus, in the lens barrel a shutter release is carried out, in which the shutter is opened to expose the imaging device (see D13). When a time "t" corresponding to the Tv value has elapsed from the time of the shutter opening, the shutter is closed (see D14) and the charge storage operation in the imaging device ends (see D15). Then, the output level of the input/output port 43 of the lens CPU 40 falls from "HIGH" to "LOW" and a shutter completion signal S24 indicating that the shutter operation has been completed is output to the interruption port 23 of the camera processor 20.

As described above, in the second embodiment the shutter control signal S31 is a shutter-open signal. The other constructions and operations are identical with those of the first embodiment.

Figure 10:
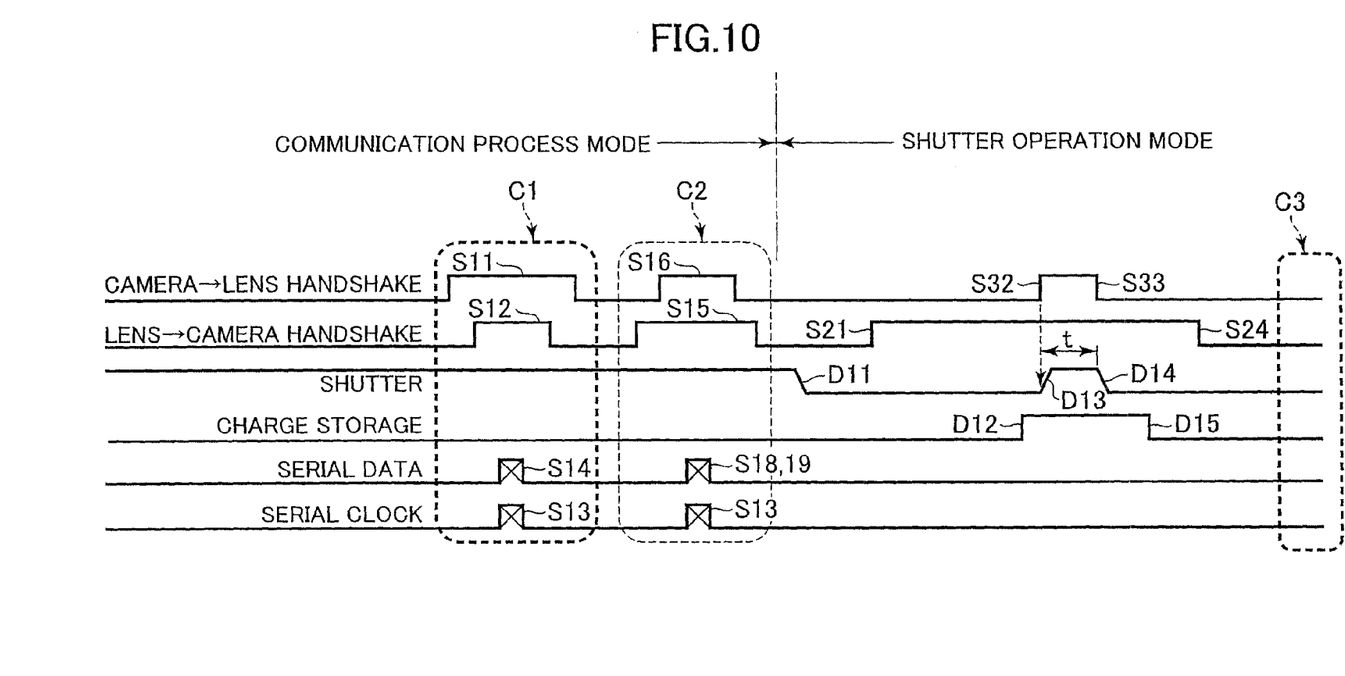
FIG. 10 is a timing chart for a shutter operation according to a communication sequence in a third embodiment.

FIG. 10 shows a shutter operation according to a communication sequence in a third embodiment. The common references have been applied to the corresponding signals from the first embodiment shown in FIG. 6. A camera of the third embodiment needs to open and close the shutter to carry out a photographing operation, but does not need to output shutter speed information (i.e., Tv value) to the lens CPU 40 since the camera processor 20 outputs a shutter-open signal and a shutter-close signal, which is different from the second embodiment.

After a command (or a camera signal S14) for a shutter operation and a response signal S19 have been communicated between the camera processor 20 and the lens CPU 40, inside the lens barrel the shutter is changed from an open state to a closed state and fixed to the closed state (see D11). Then, in the camera processor 20 a shutter preparation completion signal S21 is input so that the camera processor 20 recognizes that the shutter is closed, and the Global Reset is then carried out in the imaging device to sweep out any unnecessary electric charge so that a charge storage operation can then be started in the imaging device (see D12).

Next, the output level of the input/output port 22 of the camera processor 20 is raised from "LOW" to "HIGH", and this information is output to the interruption port 42 of the lens CPU 40 as a shutter-open signal (or shutter control signal) S32. Thus, the shutter is opened in the lens barrel (see D13). When a time "t" corresponding to the Tv value has passed from the shutter opening, the output level of the input/output port 22 of the camera processor 20 falls from "HIGH" to "LOW", and this information is output as a shutter-close signal (or shutter control signal) S33. Thus, the shutter-open signal and the shutter-close signal are output at a time interval corresponding to the shutter speed. Due to the shutter-close signal, the shutter is closed (see D14) and the charge storage operation in the imaging device ends (see D15). Then, the output level of the input/output port 43 of the lens CPU 40 falls from "HIGH" to "LOW", and a shutter completion signal S24 indicating that the shutter operation has been completed is output to the interruption port 23 of the camera processor 20.

As described above, in the third embodiment the shutter control signals S32 and S33 are a shutter-open signal and a shutter-close signal. The other constructions and operations are identical to those of the first embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2011-152153 (filed on Jul. 8, 2011) which is expressly incorporated herein, by reference, in its entirety.

The invention claimed is:

1. A shutter control device that uses an imaging device provided in a camera body to operate a shutter housed in a lens barrel to perform photography, said shutter control device comprising:

a communication port provided for transmitting and receiving signals between said camera body and said lens barrel, said communication port comprising an interruption port for transmitting an interruption signal from said camera body to said lens barrel, the interruption port transmitting a handshake signal from said camera body to said lens barrel; and a shutter controller provided in said camera body, said shutter controller outputting a shutter control signal to operate said shutter, said shutter control signal being transmitted to said lens barrel through said interruption port.

2. The shutter control device according to claim 1, further comprising an exposure-initiation processor that starts a charge storage operation in said imaging device, said shutter control signal comprising a shutter-close signal for closing said shutter.

3. The shutter control device according to claim 1, wherein said shutter control signal comprises a shutter-open signal for opening said shutter.

4. The shutter control device according to claim 3, wherein shutter speed information is transmitted from said camera body to said lens barrel through said interruption port.

5. The shutter control device according to claim 3, wherein said shutter control signal comprises a shutter-open signal for opening said shutter and a shutter-close signal for closing said shutter, said shutter-open signal and said shutter-close signal being output at a time interval corresponding to a shutter speed.

6. The shutter control device according to claim 1, further comprising a lens controller that is provided in the lens barrel, and receives a signal transmitted through the interruption port, wherein the lens controller determines whether or not the signal is the handshake signal, and determines whether or not the signal is the shutter control signal.

7. A lens barrel detachably attached to a camera body, comprising:

a communication port for transmitting and receiving signals between the camera body and said lens barrel, said communication port comprising an interruption port for receiving an interruption signal transmitted from the camera body to said lens barrel, the interruption port receiving a handshake signal transmitted from the camera body to said lens barrel; and a shutter operated by a shutter control signal output by the camera body, said shutter control signal being transmitted to said lens barrel through said interruption port.

8. A camera system, in which a lens barrel is detachably attached to a camera body, said camera system comprising:

a shutter provided in said lens barrel;

a first communication port provided in said lens barrel to transmit and receive signals between said camera body and said lens barrel, said first communication port comprising a first interruption port for receiving an interruption signal transmitted from said camera body to said lens barrel, the first interruption port receiving a handshake signal transmitted from said camera body to said lens barrel;

a second communication port provided in said camera body to transmit and receive signals between said camera body and said lens barrel, said second communication port comprising a second interruption port for transmitting the interruption signal from said camera body to said lens barrel, the second interruption port transmitting the handshake signal from said camera body to said lens barrel; and a shutter controller provided in said camera body, said shutter controller outputting a shutter control signal to operate said shutter, said shutter control signal being output from said second interruption port and input to said lens barrel through said first interruption port.

* * * * *